(12) United States Patent
French et al.

(10) Patent No.: US 9,529,809 B2
(45) Date of Patent: Dec. 27, 2016

(54) MANAGING LOG DATA USING A CIRCULAR FIXED SIZE FILE

(71) Applicant: International Business Machines Corporation, Armonk, NY (US)

(72) Inventors: Steven Michael French, Austin, TX (US); Gunisha Madan, Mountain View, CA (US); Malahal R. Naineni, Tigard, OR (US); Chandra Seetharaman, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 279 days.

(21) Appl. No.: 14/056,739

(22) Filed: Oct. 17, 2013

(65) Prior Publication Data

US 2015/0112935 A1    Apr. 23, 2015

(51) Int. Cl.
*G06F 17/30* (2006.01)
*G06F 12/02* (2006.01)
*G06F 11/34* (2006.01)
*G06F 3/06* (2006.01)

(52) U.S. Cl.
CPC ....... *G06F 17/30088* (2013.01); *G06F 3/0608* (2013.01); *G06F 11/3476* (2013.01); *G06F 12/023* (2013.01); *G06F 17/3007* (2013.01); *G06F 17/30067* (2013.01); *G06F 17/30212* (2013.01); *G06F 17/30289* (2013.01)

(58) Field of Classification Search
CPC . G06F 11/1464; G06F 11/004; G06F 11/2097; G06F 11/1458; G06F 17/30067; G06F 3/0643;G06F 3/0667; G06F 3/0671; G06F 9/3012; G06F 11/1435; G06F 17/30; G06F 17/3007; G06F 17/30212; G06F 17/30289; G06F 11/3476; G06F 11/1466; G06F 11/1451; G06F 12/023; G06F 12/1009; G06F 12/0253; G06F 3/0608
See application file for complete search history.

(56) References Cited

U.S. PATENT DOCUMENTS

| | | | |
|---|---|---|---|
| 7,831,560 B1 * | 11/2010 | Spertus et al. | 707/639 |
| 8,327,324 B1 | 12/2012 | Gong et al. | |
| 8,732,417 B1 * | 5/2014 | Stringham | G06F 11/1448 711/162 |
| 8,918,862 B2 * | 12/2014 | Bhattiprolu et al. | 726/19 |

(Continued)

*Primary Examiner* — Srirama Channavajjala
(74) *Attorney, Agent, or Firm* — Garg Law Firm, PLLC; Rakesh Garg; Steven L. Bennett

(57) ABSTRACT

A request to write new data to a file is received. The file occupies a pre-determined size of storage space in a file-system. A determination is made whether an end location amount of space from an ending location value in an attribute up to the pre-determined size is insufficient to write the new data to the file. A second amount of space is computed. The first and the second amounts of space together are sufficient to write the new data. The second amount of space begins at a starting location value in a starting location attribute. The new data is written using the first and the second amounts of space. The ending location value is changed to indicate a location at the end of new data in the second amount of space. The starting location value is changed to indicate a location where existing data begins after new data.

20 Claims, 7 Drawing Sheets

(56) References Cited

U.S. PATENT DOCUMENTS

| | | | |
|---|---|---|---|
| 2004/0019744 A1* | 1/2004 | Boucher | G06F 12/0223 711/132 |
| 2004/0111557 A1* | 6/2004 | Nakatani et al. | 711/113 |
| 2006/0161731 A1* | 7/2006 | Nakatani | G06F 11/1435 711/113 |
| 2007/0136395 A1* | 6/2007 | Fries et al. | 707/204 |
| 2007/0174669 A1* | 7/2007 | Ebata et al. | 714/6 |
| 2007/0271414 A1* | 11/2007 | Nakatani et al. | 711/113 |
| 2009/0182798 A1* | 7/2009 | Chang et al. | 709/201 |
| 2011/0173412 A1* | 7/2011 | Tabei | G06F 12/1441 711/213 |
| 2013/0073532 A1 | 3/2013 | Bachar et al. | |

* cited by examiner

MANAGING LOG DATA USING A CIRCULAR FIXED SIZE FILE

TECHNICAL FIELD

The present invention relates generally to a method, system, and computer program product for improving the storage of log data. More particularly, the present invention relates to a method, system, and computer program product for managing log data using a circular fixed size file.

BACKGROUND

Logging is the process of storing data about events occurring in a data processing system such that the data is usable for post-facto analysis of the events that generate that data. Such data is called log data, or simply log (plural: logs). A file that stores log data in a file-system is called a log file.

Some example uses of log data are in diagnostic, forensic, and auditing applications. For example, log data can be used for diagnosing a problem in the execution of a software product or a hardware component. As another example, log data can be used for investigating what went wrong or what was happening in a system at a given time. As another example, log data can be analyzed to ensure that a product or a product's operation in compliance with certain standards or requirements.

Log data can be voluminous. Some programs or components produce log data sporadically when exceptional events occur. Some other programs or components can produce substantial amounts of log data routinely or when certain events occur in a data processing system. In fact, voluminous log data has been known to fill up an entire file-system space, causing other applications or components in the data processing environment to experience trouble accessing the file-system.

SUMMARY

The illustrative embodiments provide a method, system, and computer program product for managing log data using a circular fixed size file. An embodiment receives a request to write new data to a file, the log file occupying a predetermined size of storage space in a data storage device of a file-system in a data processing system. The embodiment determines whether a first amount of space from an ending location value in an end location attribute up to the pre-determined size is insufficient to write the new data to the file, wherein the end location attribute is included in a data structure of the file. The embodiment computes, using a processor and a memory, a second amount of space, wherein the first amount of space and the second amount of space together are sufficient to write the new data to the file, wherein the second amount of space begins at a starting location value in a starting location attribute included in the data structure of the file. The embodiment writes the new data to the file using the first amount of space and the second amount of space. The embodiment changes the ending location value in the ending location attribute to indicate a location in the file at the end of the new data in the second amount of space. The embodiment changes the starting location value in the starting location attribute to indicate a location in the file where existing data begins after the new data.

Another embodiment includes a computer usable storage device including computer usable code for managing log data. The embodiment further includes computer usable code for receiving a request to write new data to a file, the log file occupying a pre-determined size of storage space in a data storage device of a file-system in a data processing system. The embodiment further includes computer usable code for determining whether a first amount of space from an ending location value in an end location attribute up to the pre-determined size is insufficient to write the new data to the file, wherein the end location attribute is included in a data structure of the file. The embodiment further includes computer usable code for computing, using a processor and a memory, a second amount of space, wherein the first amount of space and the second amount of space together are sufficient to write the new data to the file, wherein the second amount of space begins at a starting location value in a starting location attribute included in the data structure of the file. The embodiment further includes computer usable code for writing the new data to the file using the first amount of space and the second amount of space. The embodiment further includes computer usable code for changing the ending location value in the ending location attribute to indicate a location in the file at the end of the new data in the second amount of space. The embodiment further includes computer usable code for changing the starting location value in the starting location attribute to indicate a location in the file where existing data begins after the new data.

Another embodiment includes a storage device including a storage medium, wherein the storage device stores computer usable program code. The embodiment further includes a processor, wherein the processor executes the computer usable program code. The embodiment further includes computer usable code for receiving a request to write new data to a file, the log file occupying a pre-determined size of storage space in a data storage device of a file-system in a data processing system. The embodiment further includes computer usable code for determining whether a first amount of space from an ending location value in an end location attribute up to the pre-determined size is insufficient to write the new data to the file, wherein the end location attribute is included in a data structure of the file. The embodiment further includes computer usable code for computing, using a processor and a memory, a second amount of space, wherein the first amount of space and the second amount of space together are sufficient to write the new data to the file, wherein the second amount of space begins at a starting location value in a starting location attribute included in the data structure of the file. The embodiment further includes computer usable code for writing the new data to the file using the first amount of space and the second amount of space. The embodiment further includes computer usable code for changing the ending location value in the ending location attribute to indicate a location in the file at the end of the new data in the second amount of space. The embodiment further includes computer usable code for changing the starting location value in the starting location attribute to indicate a location in the file where existing data begins after the new data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
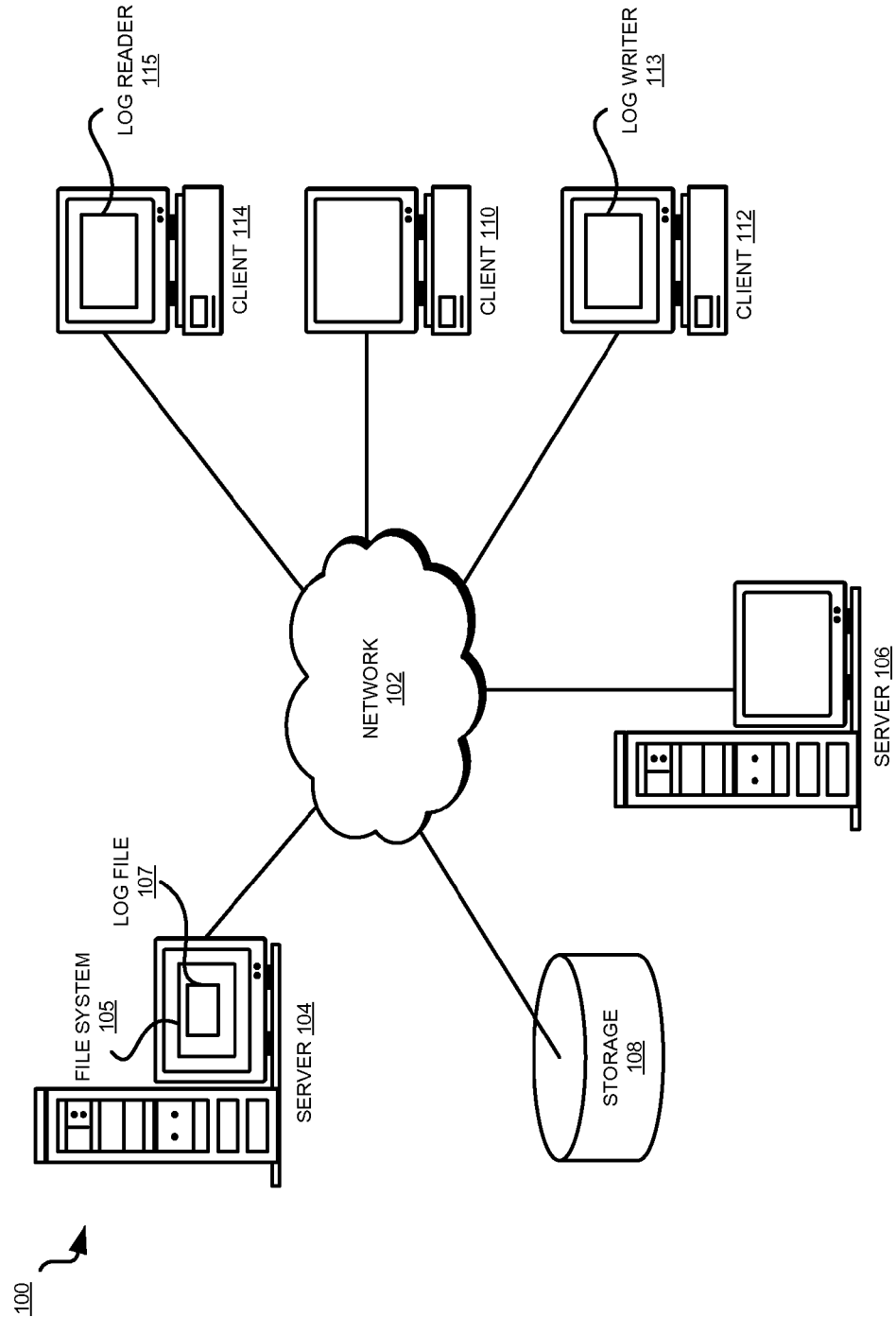
FIG. 1 depicts a block diagram of a network of data processing systems in which illustrative embodiments may be implemented.

An application, program, product, or hardware or software component, which writes log data into a file system in a data processing environment, is referred to as a writer application within this disclosure. An application, program, product, or hardware or software component, which reads log data from a file system in a data processing environment, is referred to as a reader application within this disclosure.

The illustrative embodiments recognize that presently available methods to manage the size of log data in a data processing environment offer inadequate, insufficient, or inefficient solution to managing log data. For example, one example method presently in use manages log data using many files. For example, the method allows a log file to grow only up to a threshold size, and upon reaching that size in a log file, closes the file to further write operations, and continues writing log data in a new file.

The illustrative embodiments recognize that such a method for managing the log data creates inefficiencies in the log consumption process. For example, when a process has to read the log data, the process has to load the data from several files. Furthermore, the consumer process has to also know the correct sequence in which to load or read the files so that the log data therein is in the correct order. The need for sequencing imparts rigidity to the way in which the log files can be created, named, stored, moved, or otherwise manipulated.

Another method takes the above manner of operation further. This method not only limits the size of a log file, but also limits a maximum number of log files that can exist in the file-system at any given time. When the number of log files reaches the designated limit in such a method, this method deletes an old log file to make room for a new log file to continue writing the new log data.

The illustrative embodiments recognize that such a method for managing the log data also creates similar inefficiencies in the log consumption process as the method of the previous example. For example, when a process has to read the log data, the process still has to load the data from several files. Furthermore, the consumer process still has to also know the correct sequence in which to load or read the files so that the log data therein is in the correct order. The need for sequencing continues to require the rigidity in the way in which the log files can be created, named, stored, moved, or otherwise manipulated.

Another method notifies a system or a user when the volume of log data approaches a preset limit. Such a method is passive as to controlling the log volume, and relegates the responsibility of pruning the log files or the log data in the log files to the system or the user.

The illustrative embodiments recognize that in such a method, absent a timely intervention by the system or user, the log volume can exceed the preset limit. Furthermore, one user may not agree with another user's judgment as to which log data should be pruned, resulting in improper pruning of log data.

The illustrative embodiments further recognize that generally, these example methods and other methods presently used for managing log data are dependent on user actions to some extent, spread the log data in several locations in the file-system, are restrictive on how a log writer may produce and write the logs and how a log reader may read and consume the logs, or a combination thereof. Therefore, the illustrative embodiments recognize a need for a better method for managing log data.

Furthermore, the illustrative embodiments recognize that a distinct possibility of accidental overwrite of entire log data exists in the presently used methods because the presently used methods allow a log-writer to write a log file with a write permission. If the file-system becomes full and runs out of storage space during or prior to writing new log data, the new log data is lost.

The illustrative embodiments used to describe the invention generally address and solve the above-described problems and other problems related to the log data management. The illustrative embodiments provide a method, system, and computer program product for managing log data using a circular fixed size file.

An embodiment allocates a predetermined amount of space for a log file at the time of creating the log file. The embodiment creates the log file to occupy the predetermined amount of space and sets certain attributes of the log file. For example, one embodiment sets a mode of operation allowed on the log file such that a log writer is only allowed to append to existing contents of the log file. In another embodiment, a set of pointers within the log file are initialized such that log readers and log writers can simultaneously access the contents of the log file.

Another example embodiment overwrites the old log entries in the log file with new log entries in a circular fashion. For example, a remaining amount of space in the log file from the predetermined amount of space the log file occupies is determined by a position of an end pointer within the log file. When an amount of log data to be written to the log file exceeds the remaining space, an embodiment moves the end pointer to a position past a computed amount of oldest log data within the log file. The embodiment thus creates space in a circular manner by allowing overwrite of some of the oldest log data with the new log data.

An embodiment enables a file-system to recognize a log file having some or all of the characteristics described herein as a new type of file data structure. The embodiment enables the file-system to create the new type of data structure when the log file is created.

The illustrative embodiments are described with respect to certain log data, readers, writers, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
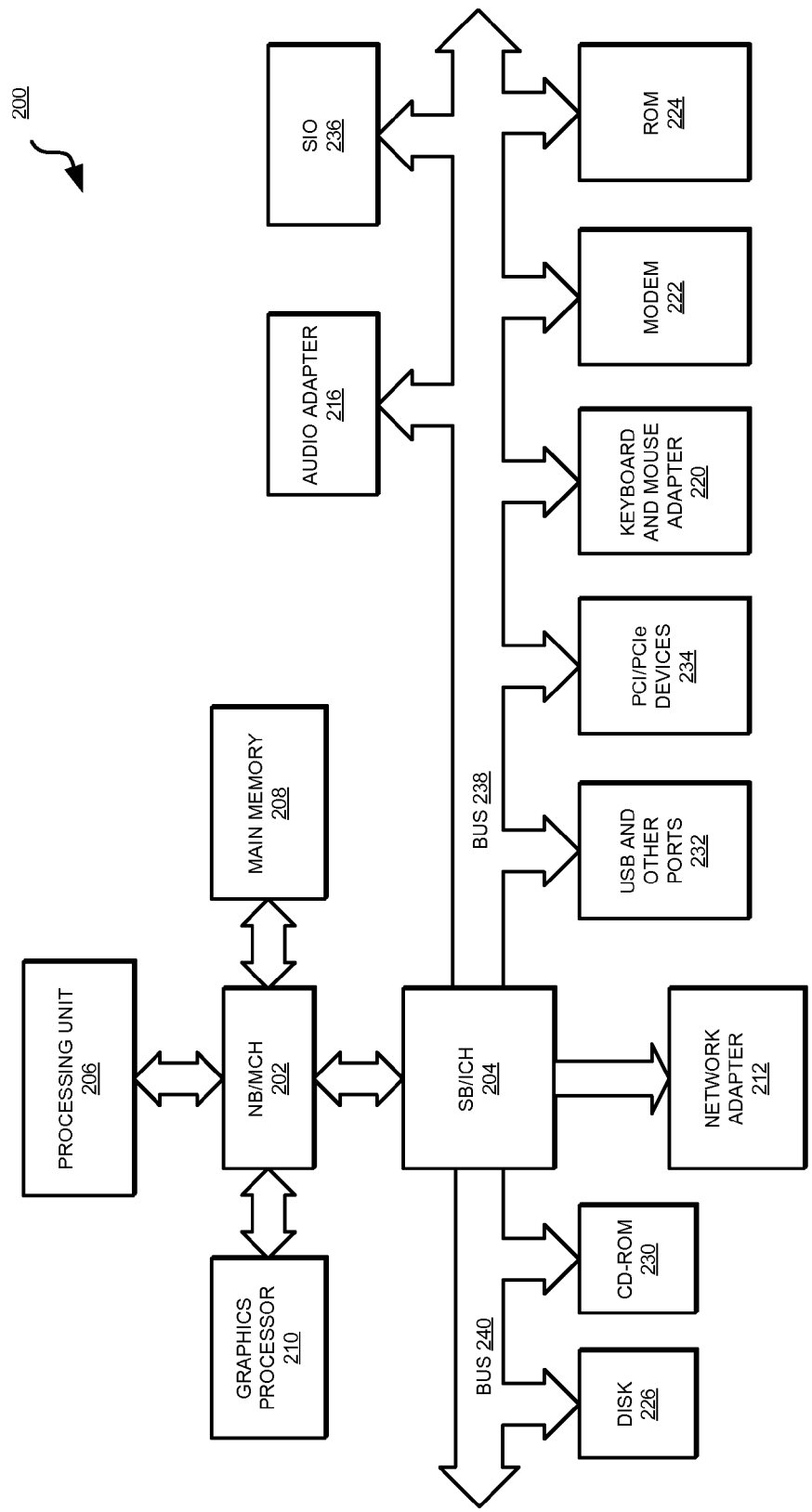
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. In one example configuration, file-system 105 in server 104 implements an embodiment to operate within or in conjunction with a prior art file-system. Log file 107 is a log file created and used according to an embodiment within file-system 105. Log writer 113 in client 112 writes log data to log file 107. Log reader 115 in client 114 reads the log data from log file 107. Log file 107 can be stored in a network accessible storage, such as by using storage 108, or in a local storage (not shown) of server 104, or a combination thereof.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD)

or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as file-system 105, log file 107, log writer 113, or log reader 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
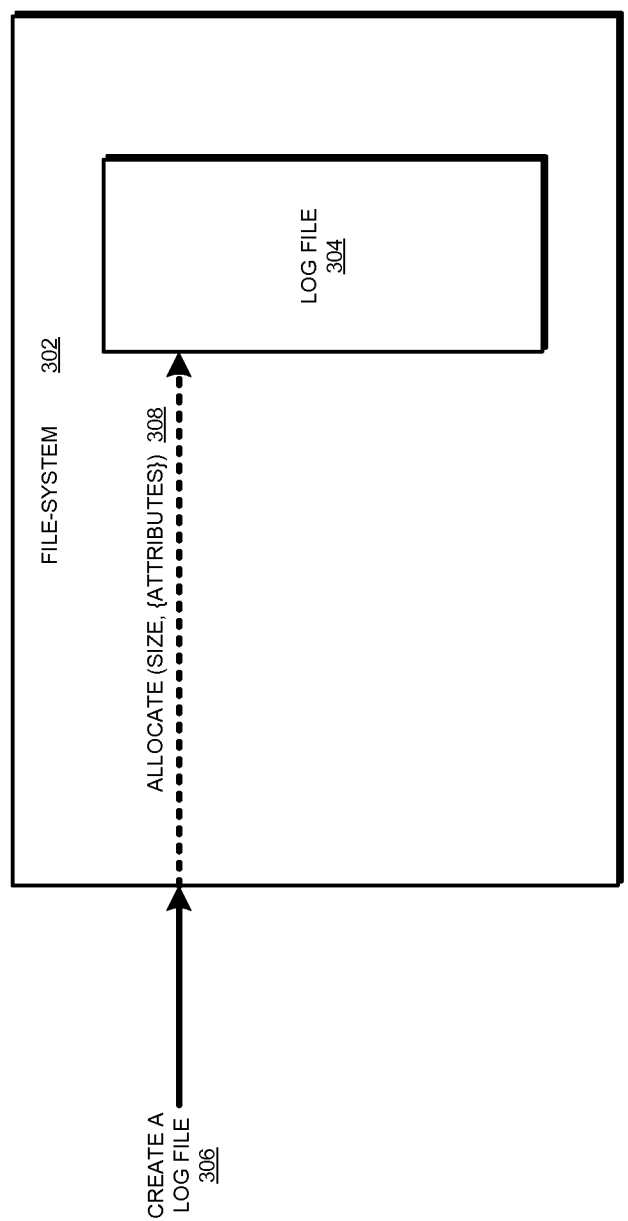
FIG. 3 depicts a block diagram of an example process for creating a circular log file in accordance with an illustrative embodiment.

With reference to FIG. 3, this figure depicts a block diagram of an example process for creating a circular log file in accordance with an illustrative embodiment. File-system 302 is an example of file-system 105 in FIG. 1. Log file 304 is an example of log file 107 in FIG. 1.

An application sends instruction 306 to file system 302 to create log file 307. In one embodiment, instruction 306 specifies a size of data storage space that file-system 302 should allocate 308 for log file 304. In another embodiment, file-system 302 uses a pre-specified size to allocate 308 the space for log file 304.

Creation of log file 304 in file system 302 entails setting of certain attributes associated with the data structure of log file 304. For example, in one embodiment, an attribute allows write operations to only append to log file 304. In another embodiment, several pointers within the data structure of log file 304 also form the attributes of log file 304 as will be described with respect to FIG. 4.

In one embodiment, instruction 306 specifies a set of values that file-system 302 should set for the attributes in the data structure of log file 304 during allocate 308. In another embodiment, file-system 302 uses a pre-specified set of values that file-system 302 should set for the attributes in the data structure of log file 304 during allocate 308.

The attributes or the specific manner of implementing an attribute as described in the above examples are not intended to be limiting on the illustrative embodiments. Those of ordinary skill in the art will be able to conceive from this disclosure other attributes and other manners of implementing them, and the same are contemplated within the scope of the illustrative embodiments. For example, while an attribute is described as a pointer, an offset or another manner of reaching a place in the file can be used to implement the attribute within the scope of the illustrative embodiments.

Figure 4:
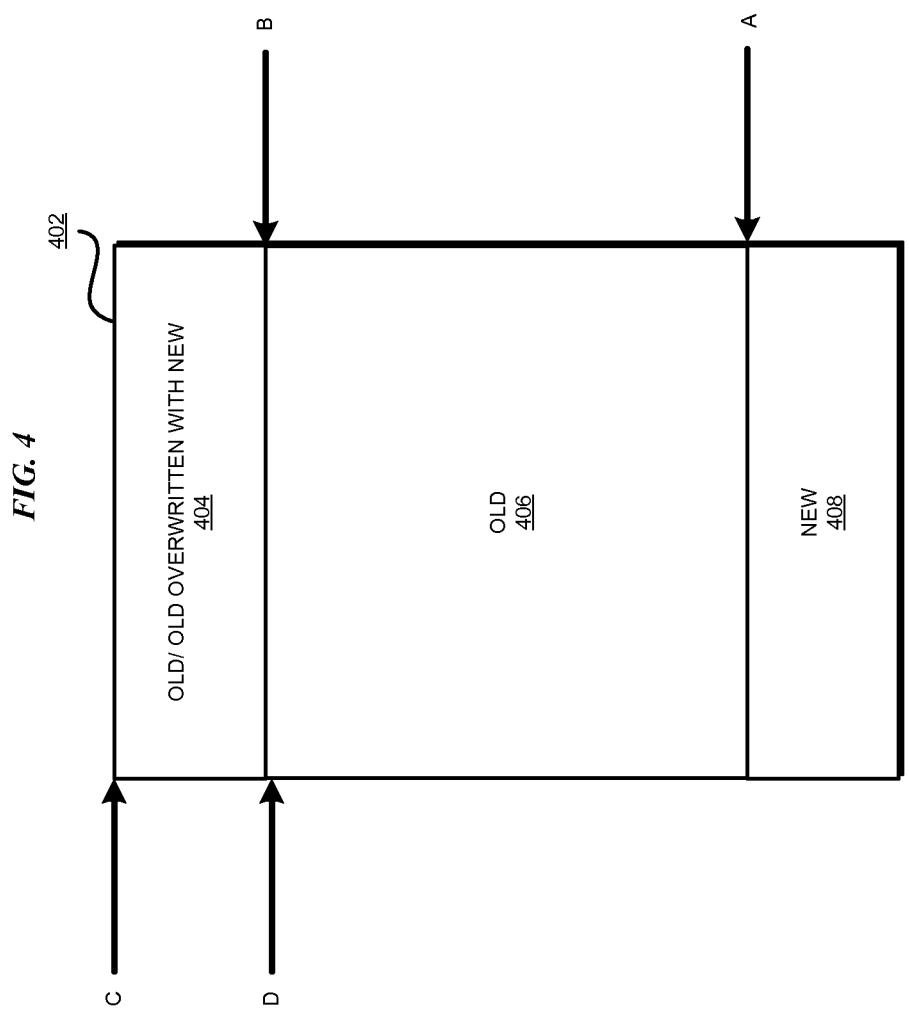
FIG. 4 depicts a block diagram of managing log data using a circular fixed size file in accordance with an illustrative embodiment.

With reference to FIG. 4, this figure depicts a block diagram of managing log data using a circular fixed size file in accordance with an illustrative embodiment. Log file 402 is an example of log file 304 in FIG. 3.

An attribute associated with log file 402 is a start pointer, or an equivalent thereof, which marks a location where a log reader can begin reading existing log data in circular log file 402. Another attribute associated with log file 402 is an end pointer, or an equivalent thereof, which marks a location where a log writer can begin writing new log data in circular log file 402.

Certain states of log file 402 are assumed and described herein only as an example without implying a limitation thereto. Assume that A and B are the 'before' and 'after' locations of the end pointer. Assume that C and D are the 'before' and 'after' locations of the start pointer. The 'before' locations of the start and end pointers are locations prior to writing of new log data to log file 402, as described herein. The 'after' locations of the start and end pointers are locations after the writing of new log data to log file 402, as described herein.

Assume, in one example scenario, that log file 402 has the start pointer set at the top of the file, to wit, at the first byte of log data in log file 402. C marks this location in this example. Log file 402 includes log data, deemed old data, in portions 404 and 406. Portion 408 is presently empty in this example.

A log writer attempts to write log data, deemed new data, which is larger than the size of portion 408. An embodiment, such as implemented in file-system 302 in FIG. 3, determines that additional space equivalent of portion 404 is needed to accommodate all the new data from the log writer.

Accordingly, the embodiment moves the end pointer to point to the end of portion 404. Log file 402 being circular, in a visual representation of log file 402, the rectangle representing log file 402 curls along X-axis such that the top and bottom edges of depicted rectangle are one and the same. Thus moving the end pointer from location A to location B makes space equivalent of total of portions 408 and 404 available for writing new data.

Assuming, for this example, that portion 408 of log file 402 was empty and portion 404 was occupied by old data, the write operation writes new data in portion 408 and overwrites old data in portion 404. Now, the oldest data in log file 402 exists after the B location, so after the write operation, any log readers will have to read log file 402 starting from the log record immediately after end pointer location B. Accordingly, the start pointer is moved from location C to the 'after' location D. Any new writes will follow the above described method from end pointer location B, and similarly move the start pointer from location D to a new location.

Note that a size of portion 404 need not be exactly the size of overflow data, to wit, the amount of new data that remains to be overwritten after writing portion 408. In one embodiment, portions are written or overwritten in blocks, and portion 404 is rounded off to the next higher block size. In another embodiment, portions are written in terms of records, and portion 404 is rounded off to the end of last record being overwritten. Other manners of rounding off the sizes of portions 404, 406, and 408 will be apparent from this disclosure to those of ordinary skill in the art and the same are contemplated within the scope of the illustrative embodiments.

The next writing of new data will have to occur starting from the end pointer location B, and overwrite the oldest log data in log file 402 in the above described manner. The embodiment moves the end pointer from location B to another location, such as further down into portion 406 or even portion 408, depending on the size of data to be written. The embodiment moves the start pointer to the log record immediately below or after the new location of the end pointer.

In terms of addresses in the storage space of the file-system, assume that the pre-determined size of the log file was allocated from a starting address to an ending address in the storage space's address space. Moving the start pointer in this manner causes the start of the log file to appear at an address other than the starting address. Likewise, moving the end pointer in this manner causes the end of the log file to appear at an address other than the ending address.

The directional references 'top,' 'bottom,' 'above,' 'below,' 'before,' and 'after' are strictly intended as visual guides with respect to FIG. 4, and such directional references pose no location limitations on the actual data of log file 402 as exists on a data storage device. Furthermore, while the initial location of the start pointer is described to be located at the top or start of log file 402, one of ordinary skill in the art can see why after an overwrite of the oldest log data, such would not be the case, and the movements of the start and end pointers will place them anywhere in log file 402. Log readers will simply begin reading the logs at the current value of the attribute that stores the start pointer, and log writers will begin writing new logs at the current value of the attribute that stores the end pointer.

Some complications can occur when a log reader attempts to read the oldest log data from the start pointer simultaneously when a log writer is attempting move that start pointer to overwrite that oldest log data. Some example ways of handling such situations are described with respect to FIG. 7.

Figure 5:
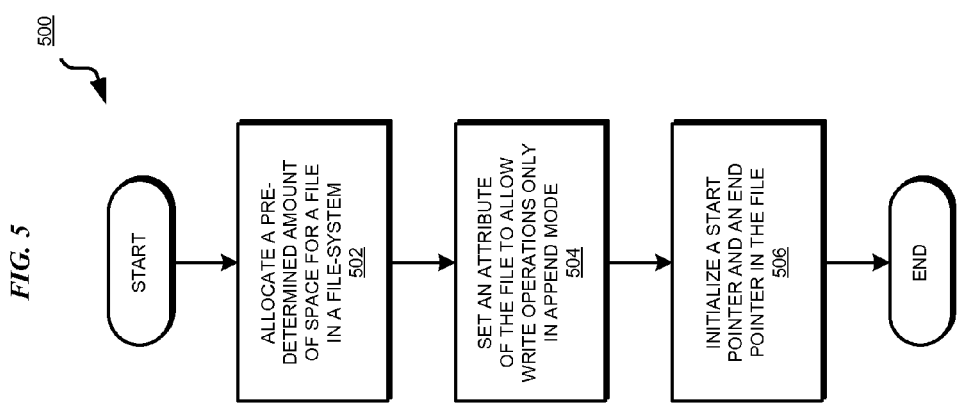
FIG. 5 depicts a flowchart of an example process of creating a circular log file in accordance with an illustrative embodiment.

With respect to FIG. 5, this figure depicts a flowchart of an example process of creating a circular log file in accordance with an illustrative embodiment. Process 500 can be implemented in file-system 302 in FIG. 3.

The file-system begins process 500 by allocating a pre-determined amount of space for a log file in the file-system (block 502). The predetermined size can be provided to the file-system in an instruction to create the log file, or as a default configuration parameter within the file system for creating the data structure of a log file of an embodiment.

The file-system sets an attribute of the log file to allow write operations on the log file to execute only in an append mode (block 504). The file-system initializes a start pointer and an end pointer, or equivalents thereof, as additional attributes of the log file data structure (block 506). The file-system ends process 500 thereafter.

Figure 6:
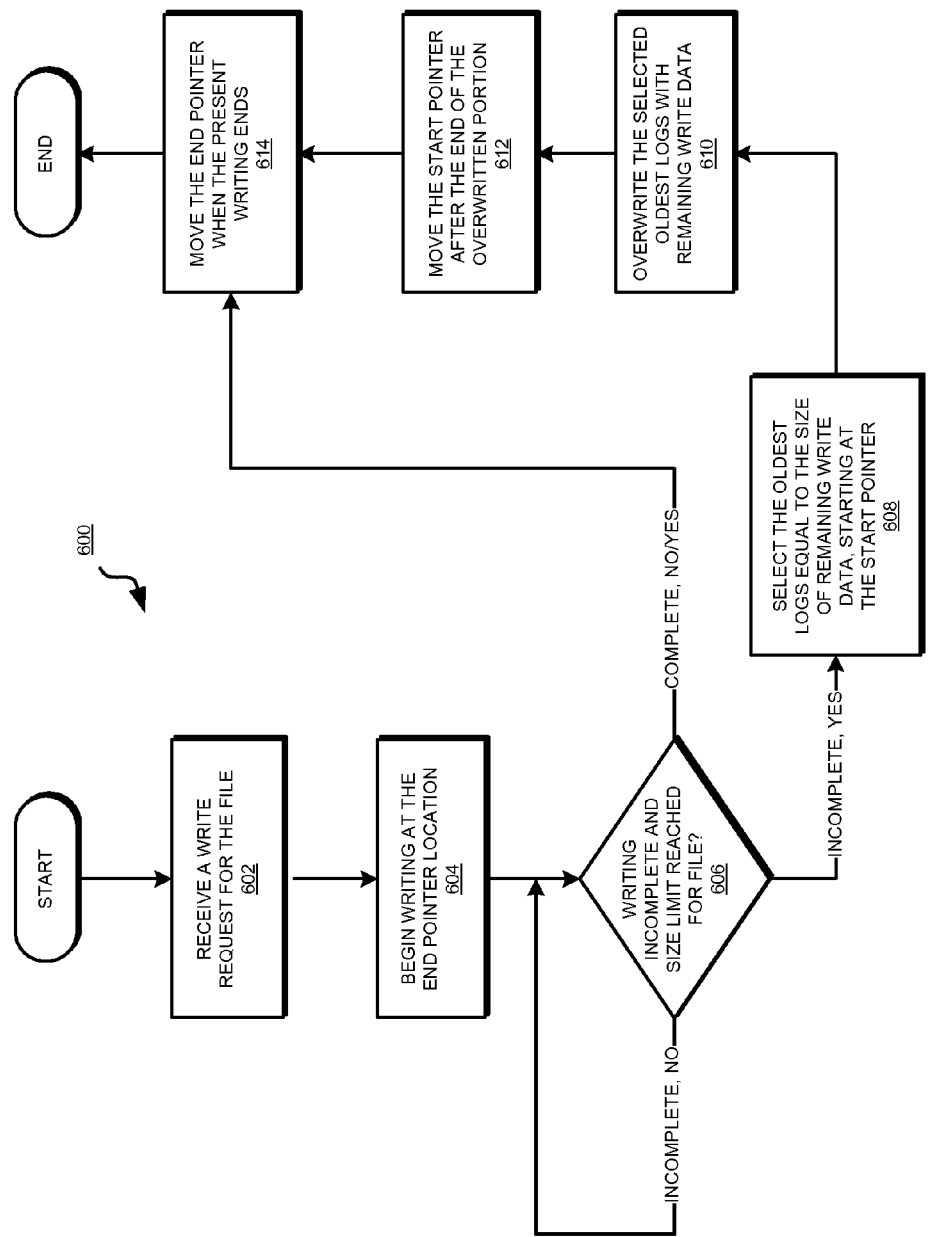
FIG. 6 depicts a flow chart of an example process of writing to a circular log file in accordance with an illustrative embodiment.

With reference to FIG. 6, this figure depicts a flow chart of an example process of writing to a circular log file in accordance with an illustrative embodiment. Process 600 can be implemented in file-system 302 in FIG. 3.

The file-system begins process 600 upon receiving a write request for a log file, such as the log file created by process 500 in FIG. 5 (block 602). The file-system begins writing the new log data of the request at the end pointer location stored in the end pointer attribute of the data structure of the log file (block 604).

The file system determines whether the writing is incomplete and the size limit of the log file has been reached (block 606). For example, as illustrated in FIG. 4, the size of the new log data to be written may exceed the space between the end pointer location and the size threshold. Consequently, the writing may remain incomplete, either actually if started, or computed to remain incomplete without actually starting to write.

If the writing is incomplete and the size limit has not been reached ("Incomplete, No" path of block 606), the file system remains at block 606 and continues writing. If the writing is complete regardless of whether the size limit has been reached ("Complete, No/Yes" path of block 606), the file-system proceeds to block 614.

If the writing is incomplete and the size limit has been reached ("Incomplete, Yes" path of block 606), the file-system selects from the log file, staring at the start pointer location stored in the start pointer attribute, an amount of the oldest logs whose total size equals the size of the new log data that remains to be written (block 608). The file-system overwrites the selected oldest logs with the new data that remains to be written (block 610).

The file-system moves the start pointer location after the end of the overwritten portion, such as to the old log data immediately next to the end of the newly written data (block 612). The file-system moves the end pointer where the presently written new data ends (block 614). The file-system ends process 600 thereafter.

Figure 7:
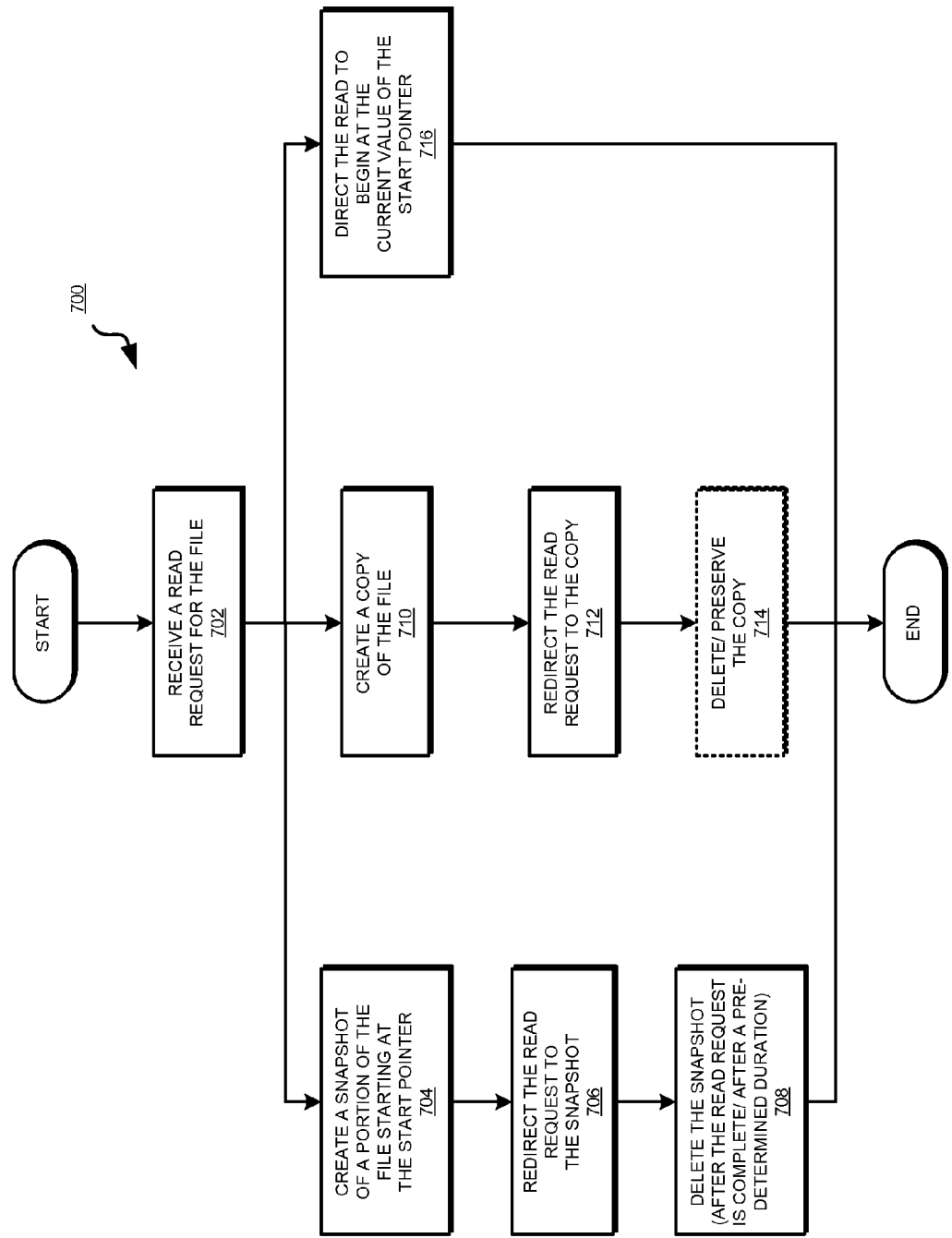
FIG. 7 depicts a flowchart of an example process of reading log data from a log file in accordance with an illustrative embodiment.

With reference to FIG. 7, this figure depicts a flowchart of an example process of reading log data from a log file in accordance with an illustrative embodiment. Process 700 can be implemented in file-system 302 in FIG. 3. Process 700 is useful, for example, when simultaneous read and write operations are expected in a log file of an embodiment.

The file-system receives a request to read data from a log file, such as from the log file being written in process 600 in FIG. 6 (block 702). Process 700 offers at least three different ways of reading data from the log file. At least two of the three ways allow safely reading old log data even if a write operation overwrites the old data while the read operation is using the old data.

For example, in one embodiment, the file-system creates a snapshot of a portion of the log file starting at the present location of the start pointer (block 704). The embodiment redirects the read request to use the snapshot instead of the log file (block 706). Operating in this manner, even if a log writer overwrites all or part of the portion included in the snapshot while the log reader is using the log data, the log reader remains unaffected by the overwrite, and retains access to the old data that has been overwritten and is no longer available in the log file.

The embodiment optionally deletes the snapshot (block 708). The embodiment causes process 700 to end thereafter in the file-system. For example, the embodiment can delete the snapshot after the read request has been processed. As another example, the embodiment can delete the snapshot after a predetermined amount of time has elapsed. As another example, the embodiment can delete the snapshot when space is needed in the file-system.

In another embodiment, the file-system creates a copy of the log file (block 710). For example, the file-system can convert the circular file to a flat file copy, starting with the data at the present start pointer and ending with the data at the present end pointer at the time of the read request.

The embodiment redirects the read request to use the copy instead of the log file (block 712). Operating in this manner, even if a log writer overwrites all or part of the log file while a log reader is using the log data, the log reader remains unaffected by the overwrite, and retains access to the old data that has been overwritten and is no longer available in the log file. The embodiment optionally deletes or preserves the copy in a manner similar to the deletion or preservation of the snapshot in block 708 (block 714). The embodiment causes process 700 to end thereafter in the file-system.

In another embodiment, the file-system simply lets the read request proceed against the log file, starting at the present value of the start pointer at the time of the request (block 716). The embodiment causes process 700 to end thereafter in the file-system. A risk in the approach of this embodiment is that the log reader can start reading at the present value of the start pointer but during the read operation, the value of the start pointer can change due to a simultaneous write. With the changed start pointer, the overwritten log data is lost to the log reader. Such occasional log data loss may be acceptable in exchange for the saving of computing resources afforded by this embodiment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for managing log data using a circular fixed size file. An embodiment eliminates the need for a log writer or a log reader to conform to rigid naming, placement, or sequencing specifications for prior art log files, as is the case with the prior art methods for managing log data. A log file according to an embodiment can be created with any suitable name, can be placed anywhere in the file-system, and avoids the need for specific sequencing of multiple log files. While the embodiments are described with respect to log data and log files, an embodiment can be implemented with respect to a file for other purposes, and to contain other types of data within the scope of the illustrative embodiments.

While the log file is created using a pre-determined size, the log file need not remain of that size during its use. For example, within the scope of the illustrative embodiments, a file-system can be instructed to, or the file-system can determine to expand or contract the log file from the predetermined size while the log file is in use. The pointers in the enlarged or shrunk log file can be adjusted to reflect the new log file size.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for managing log data, the method comprising:

receiving a request to write new data to a file, the file occupying a pre-determined size of storage space in a data storage device of a file-system in a data processing system;

determining whether a first amount of space from an ending location value in an end location attribute up to the pre-determined size is insufficient to write the new data to the file, wherein the end location attribute is included in a data structure of the file;

computing, using a processor and a memory, a second amount of space, wherein the first amount of space and the second amount of space together are sufficient to write the new data to the file, wherein the second amount of space begins at a starting location value in a starting location attribute included in the data structure of the file;

writing the new data to the file using the first amount of space and the second amount of space;

changing the ending location value in the ending location attribute to indicate a location in the file at the end of the new data in the second amount of space; and changing the starting location value in the starting location attribute to indicate a location in the file where existing data begins after the new data.

2. The method of claim 1, wherein the existing data at the starting location value in the file appears at a first address other than a beginning address in the pre-determined size of the storage space, and the existing data at the ending location value in the file appears at a second address other than a last address in the pre-determined size of the storage space.

3. The method of claim 1, further comprising:

receiving a request to read existing data from the file;

making a snapshot of a portion of the file, wherein the snapshot includes a portion of the existing data from the file starting at the starting location value in the starting location attribute; and redirecting the request to read to the snapshot, wherein the request to read is processed using the portion of the existing data in the snapshot.

4. The method of claim 3, further comprising:

deleting the snapshot when the request to read is processed.

5. The method of claim 1, further comprising:
receiving a request to read existing data from the file;
making a copy of the file, wherein the copy rearranges the existing data from the file, forming rearranged existing data, such that the existing data at the starting location value in the file appears at the beginning of the copy and the existing data at the ending location value appears at the end of the copy; and
redirecting the request to read to the copy, wherein the request to read is processed using the rearranged existing data in the copy.

6. The method of claim 1, wherein the second amount of space is occupied by the existing data in the file.

7. The method of claim 1, wherein the pre-determined size is a default size set in the file-system for the data structure of the file, further comprising:
changing the pre-determined size to a second size while the file exists in the file-system.

8. The method of claim 1, wherein the pre-determined size is specified in a request to create the file, and wherein the file-system allocates pre-determined size of the storage space beginning at a beginning address in a storage device and ending at a last address in the storage device.

9. A computer usable program product comprising a computer usable storage device including computer usable code for managing log data, the computer usable code comprising:
computer usable code for receiving a request to write new data to a file, the file occupying a pre-determined size of storage space in a data storage device of a file-system in a data processing system;
computer usable code for determining whether a first amount of space from an ending location value in an end location attribute up to the pre-determined size is insufficient to write the new data to the file, wherein the end location attribute is included in a data structure of the file;
computer usable code for computing, using a processor and a memory, a second amount of space, wherein the first amount of space and the second amount of space together are sufficient to write the new data to the file, wherein the second amount of space begins at a starting location value in a starting location attribute included in the data structure of the file;
computer usable code for writing the new data to the file using the first amount of space and the second amount of space;
computer usable code for changing the ending location value in the ending location attribute to indicate a location in the file at the end of the new data in the second amount of space; and
computer usable code for changing the starting location value in the starting location attribute to indicate a location in the file where existing data begins after the new data.

10. The computer usable program product of claim 9, wherein the existing data at the starting location value in the file appears at a first address other than a beginning address in the pre-determined size of the storage space, and the existing data at the ending location value in the file appears at a second address other than a last address in the pre-determined size of the storage space.

11. The computer usable program product of claim 9, further comprising:
computer usable code for receiving a request to read existing data from the file;
computer usable code for making a snapshot of a portion of the file, wherein the snapshot includes a portion of the existing data from the file starting at the starting location value in the starting location attribute; and
computer usable code for redirecting the request to read to the snapshot, wherein the request to read is processed using the portion of the existing data in the snapshot.

12. The computer usable program product of claim 11, further comprising:
computer usable code for deleting the snapshot when the request to read is processed.

13. The computer usable program product of claim 9, further comprising:
computer usable code for receiving a request to read existing data from the file;
computer usable code for making a copy of the file, wherein the copy rearranges the existing data from the file, forming rearranged existing data, such that the existing data at the starting location value in the file appears at the beginning of the copy and the existing data at the ending location value appears at the end of the copy; and
computer usable code for redirecting the request to read to the copy, wherein the request to read is processed using the rearranged existing data in the copy.

14. The computer usable program product of claim 9, wherein the second amount of space is occupied by the existing data in the file.

15. The computer usable program product of claim 9, wherein the pre-determined size is a default size set in the file-system for the data structure of the file, further comprising:
computer usable code for changing the pre-determined size to a second size while the file exists in the file-system.

16. The computer usable program product of claim 9, wherein the pre-determined size is specified in a request to create the file, and wherein the file-system allocates pre-determined size of the storage space beginning at a beginning address in a storage device and ending at a last address in the storage device.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for managing log data, the data processing system comprising:
a storage device including a storage medium, wherein the storage device stores computer usable program code; and
a processor, wherein the processor executes the computer usable program code, and wherein the computer usable program code comprises:
computer usable code for receiving a request to write new data to a file, the file occupying a pre-determined size of storage space in a data storage device of a file-system in a data processing system;
computer usable code for determining whether a first amount of space from an ending location value in an end location attribute up to the pre-determined size is insufficient to write the new data to the file, wherein the end location attribute is included in a data structure of the file;

computer usable code for computing, using a processor and a memory, a second amount of space, wherein the first amount of space and the second amount of space together are sufficient to write the new data to the file, wherein the second amount of space begins at a starting location value in a starting location attribute included in the data structure of the file;

computer usable code for writing the new data to the file using the first amount of space and the second amount of space;

computer usable code for changing the ending location value in the ending location attribute to indicate a location in the file at the end of the new data in the second amount of space; and computer usable code for changing the starting location value in the starting location attribute to indicate a location in the file where existing data begins after the new data.

20. The data processing system of claim 19, wherein the existing data at the starting location value in the file appears at a first address other than a beginning address in the pre-determined size of the storage space, and the existing data at the ending location value in the file appears at a second address other than a last address in the pre-determined size of the storage space.

* * * * *